Patented June 1, 1948

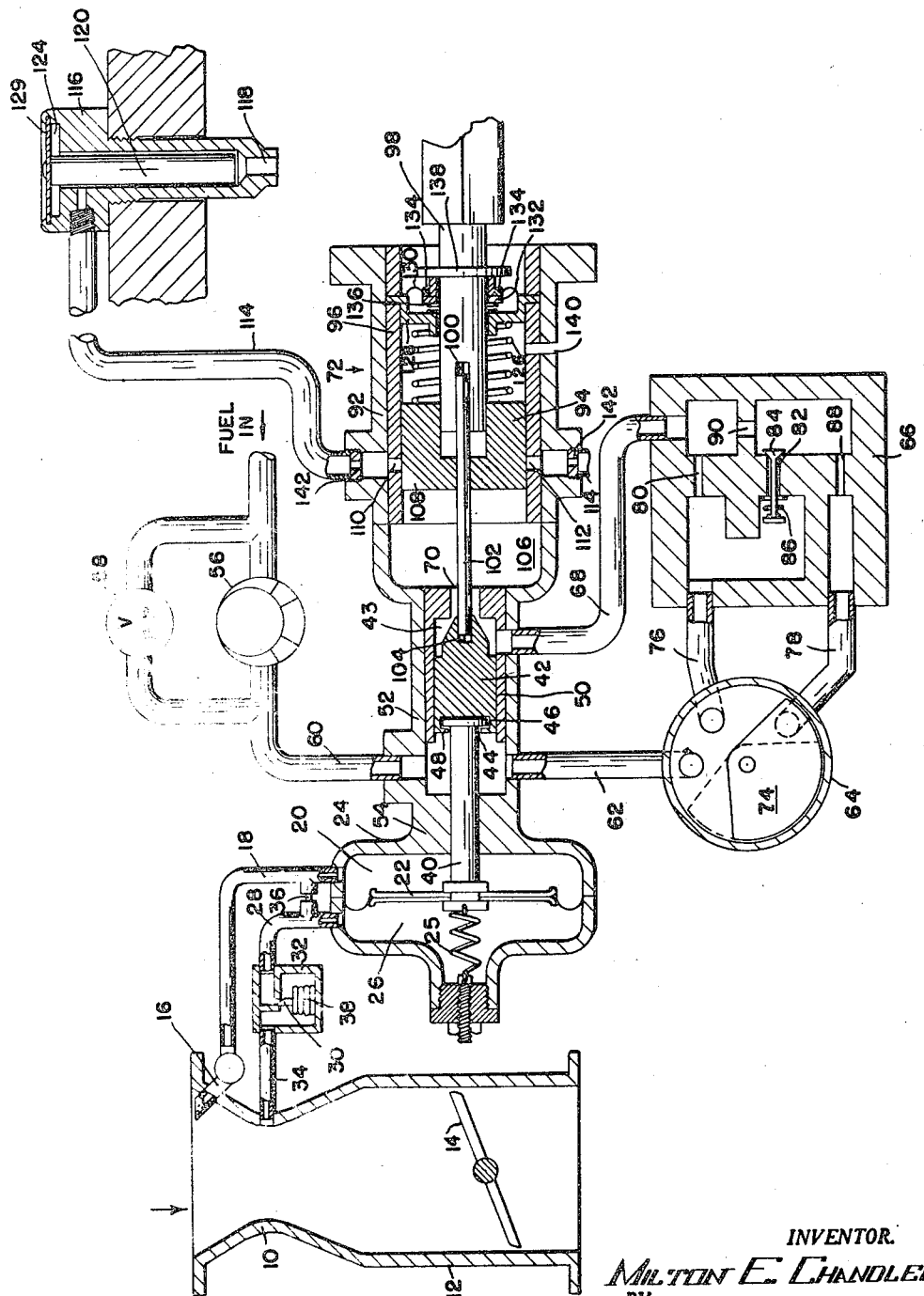

2,442,399

UNITED STATES PATENT OFFICE 2,442,399

CONTROL APPARATUS FOR COMBUSTION ENGINES

Milton E. Chandler, New Britain, Conn., assignor, by mesne assignments, to Niles-Bement-Pond Company, West Hartford, Conn., a corporation of New Jersey Application August 17, 1945, Serial No. 611,096

20 Claims. (Cl. 123—119)

1

This invention relates to apparatus for controlling the supply of fuel to an internal combustion engine.

Fuel supply systems for internal combustion engines may, generally speaking, be classified either as carburetor type systems, in which the fuel is mixed with the air in the air induction system of the engine, after which the mixture is distributed through the intake manifold to the cylinders; or as distributor type systems, wherein the fuel charge for the engine is broken up by a fuel distributor mechanism into small charges for the individual cylinders, and these charges are conveyed to the cylinders by suitable conduits. In distributor type systems, the fuel may be fed directly into the cylinders, or it may be fed to separate spray nozzles, one for each cylinder, which are located in the intake manifold adjacent the intake valves of the cylinders.

One object of the present invention is the provision of a novel distributor type fuel supply system for an internal combustion engine, including improved means for controlling the flow of fuel to the engine.

Another object is the provision of novel means of simple construction for effectively controlling the supply of fuel in a distributor type system, in response to both the rate of fuel flow and the rate of air flow to the engine so that a substantially constant ratio of fuel to air may be maintained.

The invention further provides improved means for regulating the supply of fuel to an engine through a piston movable to vary the size of a port in a chamber, said piston movement being under the control of a valve subject to opposing pressures corresponding with air and fuel flow respectively.

Another feature of the invention resides in provision for rotation of the aforementioned piston and valve concurrently, so that both said valve and said piston may be freely translated by small forces without the possibility of sticking.

Other features of the invention will be hereinafter described and claimed.

The accompanying drawing illustrates, somewhat diagrammatically, a system embodying the principles of my invention for supplying fuel to an internal combustion engine.

Referring to the drawings, there is shown an air and fuel supply system for an internal combustion engine. The air flowing to the engine passes through an air induction system including a Venturi restriction 10 and a passage 12. A throttle valve 14 is located in the passage 12 to control the flow of air to the engine.

A pressure differential is set up between the entrance and throat of the venturi 10 which is a measure of the rate of flow of air to the engine. The total, or dynamic, pressure at the air entrance is received in the open ends of a plurality of impact tubes, one of which is shown at 16, and is communicated from said tubes through a conduit 18 to a chamber 20 at one side of a diaphragm 22 within a casing 24. A chamber 26 on the opposite side of said diaphragm is connected to the throat of the venturi 10 through a conduit 28, a passage controlled by a valve 30 in a chamber 32, and a conduit 34 in communication with said chamber. The conduits 18 and 28 are connected by a restricted passage 36 to provide for a restricted flow of air therebetween around the diaphragm 22.

The valve 30 is positioned by a bellows 38 mounted in said chamber 32. The function of said valve and bellows is to reduce the total pressure differential produced by the venturi 10 by an amount sufficient to correct for decrease in density of the air due to altitude or temperature so that the pressure drop appearing across the restriction 36 is a measure of the mass of air flowing through the venturi 10 per unit of time. Since the pressure drop across the restriction 36 is applied to the diaphragm 22 which separates the chambers 20 and 26, it will be apparent that whenever air is flowing through said venturi 10 said diaphragm is subjected to a force which is a measure of the mass air flow per unit time.

At its center said diaphragm 22 is attached to a stem 40, connected in any suitable manner to a fuel valve piston 42 for imparting longitudinal movement thereto while at the same time permitting said valve piston to be continuously rotated. One form which said connection may take is that illustrated in the drawing, wherein a head 44 on said stem fits within a recess 46 in said valve piston, and wherein said head is overlapped by one or more lugs or flanges 48 on said piston. The piston 42 is surrounded by a bearing sleeve or liner 50 in a casing 52 which, as shown, may be formed as an integral extension of the casing 24. The stem 40 projects from the diaphragm 22 through a bearing provided in a wall 54 which separates the chamber 20 from the interior of said extension 52.

The fuel supply for the engine comes from a suitable tank or reservoir and is forced to the engine by a pump 56, which is diagrammatically indicated as being of the rotary sliding vane type, and which is usually engine driven. A pressure relief valve indicated at 58 maintains a substantially constant pressure at the outlet of the pump 56 independently of the quantity of fuel pumped thereby.

Fuel discharged by the pump 56 passes through a conduit 60 to a chamber in the casing 52 to the rear of the piston 42, and thence through a conduit 62, a mixture control 64, a jet system 66, a conduit 68, and an opening 70 controlled by said piston, to a distributor 72. The valve portion 43 of said piston 42 which cooperates directly with said opening 70 is tapered to vary the size of the fuel passage around said valve 43 as said valve and piston assume different positions.

The mixture control 64 includes a disc valve 74, movable between the position shown in full lines in the drawing (termed its lean position) and a position shown in dotted lines in the drawing (termed the rich position). When the mixture control valve 74 is in its lean position, fuel can flow from the mixture control 64 through only one conduit 76, of a pair of conduits 76, 78, leading to the jet system 66. When, on the other hand, said mixture control valve 74 is in its rich position, fuel can flow to the jet system through both conduits 76, 78.

Fuel entering the jet system 66 through conduit 76 passes either through a fixed restriction 80 or through a restriction 82 controlled by an enrichment valve 84 biased to closed position by a spring 86. Fuel flowing to the jet system 66 through conduit 78 passes through a fixed restriction 88. Fuel flowing through the restrictions 82 and 88 also flows through a restriction 90 before entering the conduit 68.

The distributor 72 includes a cylindrical casing 92 which may, as shown, be formed integrally with or secured to the extension 52 which houses the fuel valve. A piston 94 has rotary and sliding engagement with a bearing sleeve or liner 96 fitted within said casing 92. Said piston is continuously rotated by means of a shaft 98, preferably driven by the engine and having a squared opening 100 in one end thereof. A torque-transmitting shaft 102 of square contour fits into said recess, and passes through a corresponding squared opening in said piston, and thence into a recess 104 of corresponding squared contour in the fuel valve 42. Thereby both the piston and the fuel valve are rotated simultaneously by the shaft 100, and at the same time are readily movable longitudinally with respect to each other and to the torque-transmitting shaft 102.

Fuel flowing past the fuel valve 43 through the opening 70 enters a chamber 106 in the casing 92 at the left of the piston 94. Said piston is slotted, as indicated at 108, to provide communication between said chamber 106 and a plurality of circumferentially spaced ports extending through the bearing sleeve 96 and casing 92, two of which ports are shown at 110 and 112. Thus, as said piston rotates, said circumferentially spaced ports are brought successively into communication with the fuel-containing chamber 106.

Each of the circumferentially spaced ports above mentioned is connected by a corresponding one of a plurality of conduits 114 to a suitable injector nozzle in a corresponding cylinder of the engine or in the fuel intake passage thereof. The nozzles may be of any suitable or well-known type. One form of nozzle which may be employed is shown at 116, comprising a body threaded into the head of a cylinder of the engine, or into the fuel intake passage of said cylinder, and having an opening 118 at one end controlled by a plunger 120. The latter may be attached at its opposite end to a resilient diaphragm 122 which maintains the plunger in position to close said opening until the pressure of the fuel in the chamber beneath said head becomes sufficient to raise the plunger 120, whereupon fuel is permitted to flow around said plunger through the opening 118 and into the cylinder. Other forms of injector nozzles which may be employed, if desired, are illustrated in Figs. 4 and 5 of the copending application of Leighton Lee II, Serial No. 584,867, filed March 26, 1945, and assigned to applicant's assignee.

A spring 126, interposed between the piston 94 and a partition 128 in the sleeve 96, constantly tends to force said piston to the left, i. e., in a direction for closing the fuel outlet ports 110, 112, etc. The quantity of fuel discharged to the engine cylinders through said ports depends upon the pressure available in the chamber 106 to act on the piston and compress the spring 126. That pressure, in turn, is controlled by the valve 43.

As shown in the drawing, the rotary shaft 100 passes through an opening in the partition 128. To prevent leakage of any fluid along the outside of said shaft there may be provided a running seal comprising a flexible annular diaphragm 130, secured at its outer periphery to a flange of said partition, and secured at its inner between a pair of rings 132, 134 surrounding said shaft. A spring 136, interposed between said partition and said rings, maintains the latter pressed against a collar 138 secured to said shaft and thus provides an effective running seal.

If desired, a vent 140 may be provided in the casing 92 and liner 96 to enable fluid in the space between the piston 94 and partition 128 to pass to atmosphere, thereby preventing accumulation of such fluid in said space to such extent as to interfere with proper operation of the piston.

A restriction 142 is shown in each of the ports 110, 112. These restrictions are removable, and may be utilized to increase the amount of fuel flow to one or more of the cylinders relative to the amount supplied to the other cylinders. It has been found that in a modern aircraft engine having a large number of cylinders, certain cylinders tend to run hot, either because of uneven cooling or because of uneven fuel distribution to the cylinders. When this condition occurs the mechanism may be utilized to supply an additional amount of fuel to the cylinders which are running hot. It is well known that an increase in the richness of the fuel and air mixture supplied to the engine will make the mixture burn at a lower temperature, and hence will lower the engine temperature.

In the operation of the apparatus shown in the drawing, the differential pressure corresponding to the mass air flow per unit time through the venturi 10 acts upon the diaphragm 22 so that the latter tends to move toward the left, and thereby to increase the opening of the fuel valve 43. On the other hand, the fuel pressure differential across the jet system 66, which differential is a measure of the rate of fuel flow to the engine, acts upon the fuel valve piston 42 so that the latter tends to move toward the right, or in valve-closing direction. If the rate of air flow rises, the differential pressure in the chambers 22 and 26 becomes greater and increases the opening of the valve 43, with consequent increased fuel flow through the opening 70. The pressure in chamber 102 thus becomes greater, so that the piston 94 is forced to the right to open further the ports 110, 112, etc., whereby the rate of fuel flow to the engine is increased. The correspondingly increased fuel pressure differential across the jet system 66 acts upon the piston 42 to force the fuel valve 43 toward the right into a position wherein said differential balances the aforementioned increased air pressure differential. The fuel valve 43 remains in this position of balance until the rate of mass air flow again changes. For instance, if said air flow decreases, the fuel-pressure differential moves the piston 42 to shift the valve 43 further toward closing position, until the consequent decreased fuel pressure differential balances the diminished air-pressure differential.

It will thus be apparent that, through the apparatus above described, there is maintained a substantially constant ratio between the fuel flow and the air flow. This ratio may, of course, be varied by operation of the mixture control valve 64.

If desired, a tension spring 25 may be provided for insuring that the fuel valve 43 is maintained slightly open when no air is flowing through the venturi 10, or when the air differential pressure is very small as for low rates of air flow corresponding to idling positions of the throttle.

Throughout the operation of the engine both the fuel valve piston 42 and the piston 94 are rotated continuously with consequent elimination of static friction between them and their respective bearing sleeves 50 and 96. Said pistons are thus enabled to respond with particular precision to slight changes in the air and fuel pressure differentials.

While I have shown and described a preferred embodiment of my invention, other modifications thereof will readily occur to those skilled in the art, and I therefore intend my invention to be limited only by the appended claims.

I claim as my invention:

1. A fuel control system for an internal combustion engine, comprising rotary means for controlling the supply of fuel to the engine cylinders, said rotary means being mounted for translatory movement in response to fuel pressure for varying the amounts of fuel supplied to said cylinders, means for supplying fuel to said rotary means and including a port, a valve movable with respect to said rotary means for varying the opening of said port to alter the fuel pressure acting on said rotary means, means movable with said valve and responsive to a differential pressure corresponding to the flow of air to the engine for exerting a force on said valve in one direction, and means movable with said valve and responsive to a differential pressure corresponding to the flow of fuel to the engine for exerting a force on said valve in the opposite direction.

2. A fuel control system for an internal combustion engine, comprising rotary means for controlling the supply of fuel to the engine cylinders, said rotary means being mounted for translatory movement in response to fuel pressure for varying the amounts of fuel supplied to said cylinders, means for supplying fuel to said rotary means and including a port, a valve having a tapered portion movable in said port to alter the fuel pressure acting on said rotary means, means movable with said valve and responsive to the differential pressure of air flowing to the engine for exerting a force on said valve in one direction, and means movable with said valve and responsive to the differential pressure of fuel flowing to the engine for exerting a force on said valve in the opposite direction.

3. A fuel control system for an internal combustion engine, comprising rotary means for controlling the supply of fuel to the engine cylinders, said rotary means being mounted for translatory movement in response to fuel pressure for varying the amounts of fuel supplied to said cylinders, means for supplying fuel to said rotary means and including a port, a valve movable with respect to said rotary means for varying the opening of said port to alter the fuel pressure acting on said rotary means, and means for shifting said valve to different positions in accordance with variations in rates of fuel and air flow to the engine, said means comprising an element movable with said valve and responsive to variations in the rate of fuel flow, and another element movable with said valve and responsive to the rate of air flow.

4. A fuel control system for an internal combustion engine, comprising rotary means for controlling the supply of fuel to the engine cylinders, said rotary means being mounted for translatory movement in response to fuel pressure for varying the amounts of fuel supplied to said cylinders, means for supplying fuel to said rotary means and including a port, a valve movable with respect to said rotary means for varying the opening of said port to alter the fuel pressure acting on said rotary means, and means for shifting said valve to different positions in accordance with variations in rates of fuel and air flow to the engine, said means comprising an element movable with said valve and responsive to variations in the rate of fuel flow, and another element movable with said valve and responsive to the rate of air flow, and means connecting said other element to said valve for imparting translatory movement thereto while enabling concurrent rotation of the valve.

5. A fuel control system for an internal combustion engine, comprising fuel distributing mechanism including a cylinder, a piston movable longitudinally in said cylinder and separating two chambers between the ends of said piston and the ends of said cylinder, means including a port for supplying fuel under pressure to one of said chambers, said cylinder having a port extending through a wall thereof into communication with said chamber for the discharge of fuel therefrom, said piston being movable longitudinally in said cylinder to vary the opening of said discharge port, a valve movable with respect to said piston for varying the opening of the first-mentioned port to alter the fuel pressure acting upon said piston, means responsive to differential pressure corresponding to the flow of fuel to the engine for exerting a force upon said valve in one direction, and means responsive to differential pressure corresponding to the flow of air to the engine for exerting a force upon said valve in the opposite direction.

6. A fuel control system for an internal combustion engine, comprising fuel distributing mechanism including a cylinder, a piston movable longitudinally in said cylinder and separating two chambers between the ends of said piston and the ends of said cylinder, means including a port for supplying fuel under pressure to one of said chambers, said cylinder having a port extending through a wall thereof into communication with said chamber for the discharge of fuel therefrom, said piston being movable longitudinally in said cylinder to vary the opening of said discharge port, a valve movable with respect to said piston for varying the opening of the first-mentioned port to alter the fuel pressure acting upon said piston, means responsive to differential pressure corresponding to the flow of fuel to the engine for exerting a force upon said valve in one direction, means responsive to differential pressure corresponding to the flow of air to the engine for shifting said valve in the opposite direction, and means for rotating said piston.

7. A fuel control system for an internal combustion engine, comprising fuel distributing mechanism including a cylinder, a piston movable longitudinally in said cylinder and separating two chambers between the ends of said piston and the ends of said cylinder, means including a port for supplying fuel under pressure to one of said chambers, said cylinder having a port extending through a wall thereof into communication with said chamber for the discharge of fuel therefrom, said piston being movable longitudinally in said cylinder to vary the opening of said discharge port, a valve movable with respect to said piston for varying the opening of the first-mentioned port to alter the fuel pressure acting upon said piston, means responsive to differential pressure corresponding to the flow of fuel to the engine for exerting a force upon said valve in one direction, means responsive to differential pressure corresponding to the flow of air to the engine for shifting said valve in the opposite direction, and means connecting said piston and said valve for concurrent rotation.

8. A fuel control system for an internal combustion engine, comprising rotary means for controlling the supply of fuel to the engine cylinders, said rotary means being mounted for translatory movement in response to fuel pressure for varying the amounts of fuel supplied to said cylinders, means for supplying fuel to said rotary means and including a port, a valve movable with respect to said port to vary the fuel pressure acting on said rotary means, and means for operating said valve to maintain a substantially constant ratio between fuel and air supplied to said engine, the last-mentioned means comprising an element connected to said valve means for shifting the latter in one direction in response to variations in the rate of air flow to the engine, and another element connected to said valve means for shifting the latter in the opposite direction in response to variations in the rate of fuel flow to said engine.

9. A fuel control system for an internal combustion engine comprising a cylinder, a piston in said cylinder, said cylinder having a fuel inlet port and a fuel outlet port on the same side of said piston, said piston being movable for controlling the extent of fuel discharge through said outlet port, means for subjecting opposite faces of said piston to the differential pressure of fuel flowing to said engine, and means for producing continuous relative rotation between said piston and cylinder to prevent sticking of said piston in said cylinder.

10. A fuel control system for an internal combustion engine comprising a cylinder, a piston movable longitudinally in said cylinder and separating two chambers between the ends of said piston and the ends of said cylinder, one of said chambers having a fuel inlet port and a fuel outlet port, said piston being movable longitudinally in said cylinder to vary the opening of said outlet port, means for admitting to the other chamber fuel under a higher pressure than that entering said inlet port whereby said piston is subjected on opposite faces to a differential pressure of fuel flowing to the engine, and means for producing continuous relative rotation between said piston and cylinder to prevent sticking of said piston in said cylinder.

11. A fuel system for an internal combustion engine comprising a conduit for fuel, a fixed metering restriction in said conduit, valve means for controlling the flow thru said conduit including a cylinder, a piston movable therein, and a valve member connected to said piston for movement therewith, fluid pressure transmitting connections between said fuel line at the opposite sides of said restriction and the opposite ends of said cylinder, respectively, a port in said cylinder which may be opened and closed by said valve member, and means driven by said engine for continuously rotating said piston to prevent sticking thereof and thereby to render said valve more sensitive to changes in the pressure drop across said metering restriction.

12. A fuel supply system for an internal combustion engine comprising a conduit for fuel, a fixed metering restriction in said conduit, valve means for controlling the flow thru said conduit including a cylinder, a piston movable therein, a valve member formed on one end of said piston, and a port formed in the adjacent end of said cylinder to cooperate with said valve member, fluid pressure transmitting connections between said fuel line at the opposite sides of said restriction and the opposite ends of said cylinder, respectively, and means driven by said engine for continuously rotating said piston to prevent sticking thereof and thereby to render said valve more sensitive to changes in the pressure drop across said metering restriction.

13. A fuel supply system for an internal combustion engine comprising a conduit for fuel, a fixed metering restriction in said conduit, valve means for controlling the flow thru said conduit including a cylinder, a piston movable therein, a port formed in one end of said cylinder, and a valve member formed on the end of said piston adjacent said port for cooperation therewith, fluid pressure transmitting connections between said fuel line at the opposite sides of said restriction and the opposite ends of said cylinder, respectively, a driving element extending thru said port and engaging said valve, a coupling bebetween said element and said valve to cause concurrent rotation thereof while permitting relative reciprocation thereof, and means driven by said engine for continuously rotating said element and thereby said valve and piston to prevent sticking thereof and thereby to render said valve more sensitive to changes in the pressure drop across said metering restriction.

14. A fuel supply system for an internal combustion engine comprising a conduit for fuel, a fixed metering restriction in said conduit, valve means for controlling the flow thru said conduit including a cylinder, a piston movable therein, a port formed in one end of said cylinder, and a valve member formed on the end of said piston adjacent said port for cooperation therewith, fluid pressure transmitting connections between said fuel line at the opposite sides of said restriction and the opposite ends of said cylinder, respectively, the downstream side of said restriction being connected to said one end of said cylinder so that said valve moves in a fuel flow decreasing direction whenever the pressure differential across said restriction increases, and means driven by said engine for continuously rotating said piston to prevent sticking thereof and thereby to render said valve more sensitive to changes in the pressure drop across said metering restriction.

15. A fuel supply system for an internal combustion engine comprising a conduit for fuel, metering restriction means in said conduit, valve means for controlling the flow thru said conduit including a cylinder, a piston reciprocable and rotatable therein, a valve member formed on one end of said piston, and a port formed in the adjacent portion of said cylinder to cooperate with said valve member, fluid pressure transmitting connections between said fuel line at the opposite sides of said restriction and the opposite ends of said cylinder, respectively, and means driven by said engine for continuously rotating said piston to prevent sticking thereof and thereby to render said valve more sensitive to changes in the pressure drop across said metering restriction.

16. A fuel supply system for an internal combustion engine comprising a conduit for fuel, metering restriction means in said conduit, valve means for controlling the flow thru said conduit including a cylinder spaced from said restriction means, a piston reciprocable and rotatable therein, and a valve member formed on one end of said piston, and a port formed in the adjacent portion of said cylinder to cooperate with said valve member, fluid pressure transmitting connections between said fuel line at the opposite sides of said restriction and the opposite ends of said cylinder, respectively, and means driven by said engine for continuously rotating said piston to prevent sticking thereof and thereby to render said valve more sensitive to changes in the pressure drop across said metering restriction.

17. A fuel supply system for an internal combustion engine comprising a conduit for fuel, metering restriction means in said conduit, valve means for controlling the flow thru said conduit including a cylinder, a piston reciprocable and rotatable therein, a valve member formed on one end of said piston, and a port formed in the adjacent end of said cylinder to cooperate with said valve member, fluid pressure transmitting connections between said fuel line at the opposite sides of said restriction and the opposite ends of said cylinder, respectively, a rotary fuel distributor for said engine aligned with said port to receive fuel therefrom, means driven by said engine for continuously rotating said distributor, and a coupling extending thru said port between said distributor and said piston to cause concurrent rotation thereof while permitting relative reciprocation thereof, said rotation of said piston acting to prevent sticking thereof and thereby to render said valve more sensitive to changes in the pressure drop across said metering restriction means.

18. A fuel supply system for an internal combustion engine comprising a conduit for fuel, metering restriction means in said conduit, valve means for controlling the flow thru said conduit including a cylinder spaced from said restriction means, a piston reciprocable and rotatable therein, a valve member formed on one end of said piston, and a port formed in the adjacent portion of said cylinder to cooperate with said valve member, fluid pressure transmitting connections between said fuel line at the opposite sides of said restriction and the opposite ends of said cylinder, respectively, a rotary fuel distributor for said engine, means driven by said engine for continuously rotating said distributor and said piston to prevent sticking thereof and thereby to render said valve more sensitive to changes in the pressure drop across said metering restriction.

19. A fuel supply system for an internal combustion engine comprising a conduit for fuel, metering restriction means in said conduit, valve means for controlling the flow thru said conduit including a cylinder spaced from said restriction means, a piston reciprocable and rotatable therein, a valve member formed on one end of said piston, and a port formed in the adjacent end of said cylinder to cooperate with said valve member, fluid pressure transmitting connections between said fuel line at the opposite sides of said restriction and the opposite ends of said cylinder, respectively, so that the fuel pressure differential across said restriction acts on said piston in a direction to move said valve in a fuel flow decreasing direction, means for applying to said piston a force opposing said fuel pressure differential, a rotary fuel distributor for said engine, means driven by said engine for continuously rotating said distributor and said piston to prevent sticking thereof and thereby to render said valve more sensitive to changes in the pressure drop across said metering restriction.

20. A fuel control system for an internal combustion engine comprising a cylinder, a piston movable longitudinally in said cylinder and separating two chambers between the ends of said piston and the ends of said cylinder, one of said chambers having a fuel inlet port and a fuel outlet port, said piston being movable longitudinally in said cylinder to vary the opening of said outlet port, restricted passage means for the flow of fuel to said inlet port, and means communicating with the other of said chambers for admitting thereto fuel from a point upstream of said restriction, whereby said piston is subjected on opposite faces to a differential pressure of fuel flowing to the engine, and means for rotating said piston.

MILTON E. CHANDLER.

REFERENCES CITED

The following references are of record in the file of this patent:

UNITED STATES PATENTS

| Number | Name | Date |
|---|---|---|
| 2,341,257 | Wunsch | Feb. 8, 1944 |
| 2,372,306 | Adair | Mar. 27, 1945 |